United States Patent
Lee et al.

(10) Patent No.: US 10,574,315 B2
(45) Date of Patent: Feb. 25, 2020

(54) METHOD FOR TRANSMITTING AND RECEIVING SIGNAL BASED ON NON-ORTHOGONAL MULTIPLE ACCESS SCHEME AND APPARATUS THEREFOR

(71) Applicant: LG ELECTRONICS INC., Seoul (KR)

(72) Inventors: Hojae Lee, Seoul (KR); Hyunsoo Ko, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 82 days.

(21) Appl. No.: 15/750,487

(22) PCT Filed: Jul. 25, 2016

(86) PCT No.: PCT/KR2016/008107
§ 371 (c)(1),
(2) Date: Feb. 5, 2018

(87) PCT Pub. No.: WO2017/026700
PCT Pub. Date: Feb. 16, 2017

(65) Prior Publication Data
US 2019/0020388 A1    Jan. 17, 2019

Related U.S. Application Data

(60) Provisional application No. 62/202,183, filed on Aug. 7, 2015.

(51) Int. Cl.
*H04B 7/0456*   (2017.01)
*H04L 1/18*     (2006.01)
*H04L 5/00*     (2006.01)

(52) U.S. Cl.
CPC ......... *H04B 7/0478* (2013.01); *H04L 1/1893* (2013.01); *H04L 5/0053* (2013.01)

(58) Field of Classification Search
None
See application file for complete search history.

(56) References Cited

U.S. PATENT DOCUMENTS

2010/0039928 A1* 2/2010 Noh ............... H04B 7/0617
                                                 370/210
2011/0164701 A1* 7/2011 Nikopourdeilami ..........
                                                 H03M 7/3088
                                                 375/295

(Continued)

FOREIGN PATENT DOCUMENTS

KR    1020150070973    6/2015
WO    2015065113       5/2015

OTHER PUBLICATIONS

PCT International Application No. PCT/KR2016/008107, Written Opinion of the International Searching Authority dated Oct. 24, 2016, 28 pages.

(Continued)

*Primary Examiner* — Rebecca E Song
(74) *Attorney, Agent, or Firm* — Lee Hong Degerman Kang Waimey

(57) ABSTRACT

A method for receiving, by a terminal, a signal on the basis of a non-orthogonal multiple access scheme in a wireless communication system comprises the steps of: receiving, from a base station, control information including information on a codebook selected for the terminal among predefined codebooks for non-orthogonal multiple access and information on a codeword selected from the selected codebook; receiving, from the base station, data for the terminal according to scheduling of the control information; and detecting data for the terminal by performing a multi-user (Continued)

detection (MUD) scheme on the basis of the information on the selected codebook and the information on the selected codeword.

16 Claims, 9 Drawing Sheets

(56) References Cited

U.S. PATENT DOCUMENTS

| | | | |
|---|---|---|---|
| 2013/0215987 A1* | 8/2013 | Lee | H04B 7/0478 375/267 |
| 2014/0140360 A1* | 5/2014 | Nikopour | H04J 13/00 370/479 |
| 2015/0043540 A1 | 2/2015 | Nikopour et al. | |

OTHER PUBLICATIONS

Aust, S. et al., "Codebook Selection Strategies in Long-range Sub-1 GHz WLANs", Procedia Computer Science, vol. 32, 2014, pp. 133-140, 8 pages.

5GNOW, "Final 5GNOW Transceiver and frame structure concept", D3.3, Version 1.0, May 2015, 95 pages.

European Patent Office Application Serial No. 16835340.7, Search Report dated Feb. 11, 2019, 6 pages.

Huawei, et al., "Candidate schemes for superposition transmission", 3GPP TSG RAN WG1 Meeting #81, R1-152493, XP050970939, May 2015, 12 pages.

Fathy, M. et al., "Unequal Error Protection Coded Interleave Division Multiple Access", IEEE, innovative Computing Technology (INTECH), Sep. 2012, XP032328786, 6 pages.

LG Electronics, "Considerations on DL/UL multiple access for NR", 3GPP TSG RAN WG1 Meeting #84bis, R1-162517, XP051080253, Apr. 2016, 4 pages.

LG Electronics, "Initial LLS Evaluation Result for NoMA", 3GPP TSG RAN WG1 Meeting #85, R1-164557, KP051089957, May 2016, 8 pages.

* cited by examiner

METHOD FOR TRANSMITTING AND RECEIVING SIGNAL BASED ON NON-ORTHOGONAL MULTIPLE ACCESS SCHEME AND APPARATUS THEREFOR

CROSS-REFERENCE TO RELATED APPLICATIONS

This application is the National Stage filing under 35 U.S.C. 371 of International Application No. PCT/KR2016/008107, filed on Jul. 25, 2016, which claims the benefit of U.S. Provisional Application No. 62/202,183, filed on Aug. 7, 2015, the contents of which are all hereby incorporated by reference herein in its entirety.

TECHNICAL FIELD

The present invention relates to wireless communication, and more particularly, to a method for transmitting and receiving a signal based on a non-orthogonal multiple access scheme and an apparatus therefor.

BACKGROUND ART

A 3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms. Also, the future 5G technology requires more massive UE connectivity for one base station, and it is expected that 5G requirement connectivity will be increased to maximum 1,000,000/km2.

DISCLOSURE

Technical Problem

An object of the present invention is to provide a method for receiving a signal in a UE based on a non-orthogonal multiple access scheme in a wireless communication system.

Another object of the present invention is to provide a method for transmitting a signal from a base station based on a non-orthogonal multiple access scheme in a wireless communication system.

Still another object of the present invention is to provide a UE for receiving a signal based on a non-orthogonal multiple access scheme in a wireless communication system.

Further still another object of the present invention is to provide a base station for transmitting a signal based on a non-orthogonal multiple access scheme in a wireless communication system.

Further still another object of the present invention is to provide a method for transmitting a signal from a UE based on a non-orthogonal multiple access scheme in a wireless communication system.

Further still another object of the present invention is to provide a method for receiving a signal in a base station based on a non-orthogonal multiple access scheme in a wireless communication system.

Further still another object of the present invention is to provide a UE for transmitting a signal based on a non-orthogonal multiple access scheme in a wireless communication system.

Further still another object of the present invention is to provide a base station for receiving a signal based on a non-orthogonal multiple access scheme in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve one object of the present invention, a method for receiving, by a user equipment (UE), a signal based on a non-orthogonal multiple access scheme in a wireless communication system comprises the steps of receiving, from a base station (BS), control information including information on a codebook selected for the UE among predefined codebooks for non-orthogonal multiple access and information on a codeword selected from the selected codebook; receiving, from the BS, data for the UE according to scheduling of the control information; and detecting data for the UE by performing a multi-user detection (MUD) scheme based on the information on the selected codebook and the information on the selected codeword. The information on the codebook selected for the UE and the information on a codeword selected from the selected codebook may be selected based on a scheduling scheme. The information on the selected codebook may include a selected codebook index, and the information on the selected codeword may include a selected codeword index. The selected codebook index and the selected codeword index may be selected UE-specifically. The selected codebook may be configured that a chordal distance between codewords to have a value of $$\sqrt{1 - \frac{(N-1)K}{N(K-1)}}$$

or more, where N indicates a vector length of a codeword, and K indicates the number of codewords.

To achieve another object of the present invention, a method for transmitting, by a base station (BS), a signal based on a non-orthogonal multiple access scheme in a wireless communication system comprises the steps of selecting a codebook selected for the UE among predefined codebooks for non-orthogonal multiple access and a codeword for the UE from the selected codebook; transmitting, to the UE, control information including information on the selected codebook and the information on the selected codeword; and transmitting, to the UE, data for the UE according to scheduling of the control information. The selected codebook and the selected codeword may be selected based on a scheduling scheme. The selected codebook and the selected codeword may be selected UE-specifically.

To achieve still another object of the present invention, a UE for receiving a signal based on a non-orthogonal multiple access scheme in a wireless communication system comprises a receiver configured to receive, from a base station (BS), control information including information on a codebook selected for the UE among predefined codebooks for non-orthogonal multiple access and information on a codeword selected from the selected codebook, and receive, from the BS, data for the UE according to scheduling of the control information; and a processor configured to detect data for the UE by performing a multi-user detection (MUD) scheme on the basis of the information on the selected codebook and the information on the selected codeword.

To achieve further still another object of the present invention, a base station (BS) for transmitting a signal based on a non-orthogonal multiple access scheme in a wireless communication system comprises a processor configured to select a codebook for a UE among predefined codebooks for non-orthogonal multiple access and a codeword for the UE from the selected codebook; and a transmitter configured to transmit, to the UE, control information including information on the selected codebook and the information on the selected codeword and transmit, to the UE, data for the UE according to scheduling of the control information.

To achieve further still another object of the present invention, a method for transmitting, by a user equipment (UE), a signal based on a non-orthogonal multiple access scheme in a wireless communication system comprises the steps of receiving, from a base station (BS), control information including information on a codebook selected for the UE among predefined codebooks for non-orthogonal multiple access and information on a codeword selected from the selected codebook; performing resource mapping for an uplink signal to be transmitted based on the information on the selected codebook and the information on the selected codeword; and transmitting, to the BS, the uplink signal mapped into a corresponding resource in accordance with the resource mapping. The selected codebook and the selected codeword may be selected UE-specifically.

To achieve further still another object of the present invention, a method for receiving, by a base station (BS), a signal based on a non-orthogonal multiple access scheme in a wireless communication system comprises the steps of selecting a codebook for the UE among predefined codebooks for non-orthogonal multiple access and a codeword for the UE from the selected codebook; transmitting, to the UE, control information including information on the selected codebook and information on the selected codeword; receiving, from the UE, an uplink signal of the UE according to scheduling of the control information; and detecting the uplink signal transmitted from the UE by performing multi-user detection (MUD) scheme on the basis of the selected codebook and the selected codeword. The information on the selected codebook may include an index of the selected codebook, and the information on the selected codeword may include an index of the selected codeword, and the selected codebook index and the selected codeword index may be selected UE-specifically.

To achieve further still another object of the present invention, a UE for transmitting a signal based on a non-orthogonal multiple access scheme in a wireless communication system comprises a receiver configured to receive, from a base station (BS), control information including information on a codebook selected for the UE among predefined codebooks for non-orthogonal multiple access and information on a codeword selected from the selected codebook; a processor configured to perform resource mapping for an uplink signal to be transmitted based on the information on the selected codebook and the information on the selected codeword; and a transmitter configured to transmit, to the BS, the uplink signal mapped into a corresponding resource in accordance with the resource mapping.

To achieve further still another object of the present invention, a base station (BS) for receiving a signal based on a non-orthogonal multiple access scheme in a wireless communication system comprises a processor configured to select a codebook for the UE among predefined codebooks for non-orthogonal multiple access and a codeword for the UE from the selected codebook; a transmitter configured to transmit, to the UE, control information including information on the selected codebook and information on the selected codeword; and a receiver configured to receive, from the UE, an uplink signal of the UE according to scheduling of the control information, wherein the processor is configured to detect the uplink signal transmitted from the UE by performing multi-user detection (MUD) scheme on the basis of the selected codebook and the selected codeword.

Advantageous Effects

Throughout may be enhanced and massive connectivity may be supported using a non-orthogonal coded multi-group multiple access (NCMA) scheme suggested in the present invention, whereby communication throughput may be improved remarkably.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
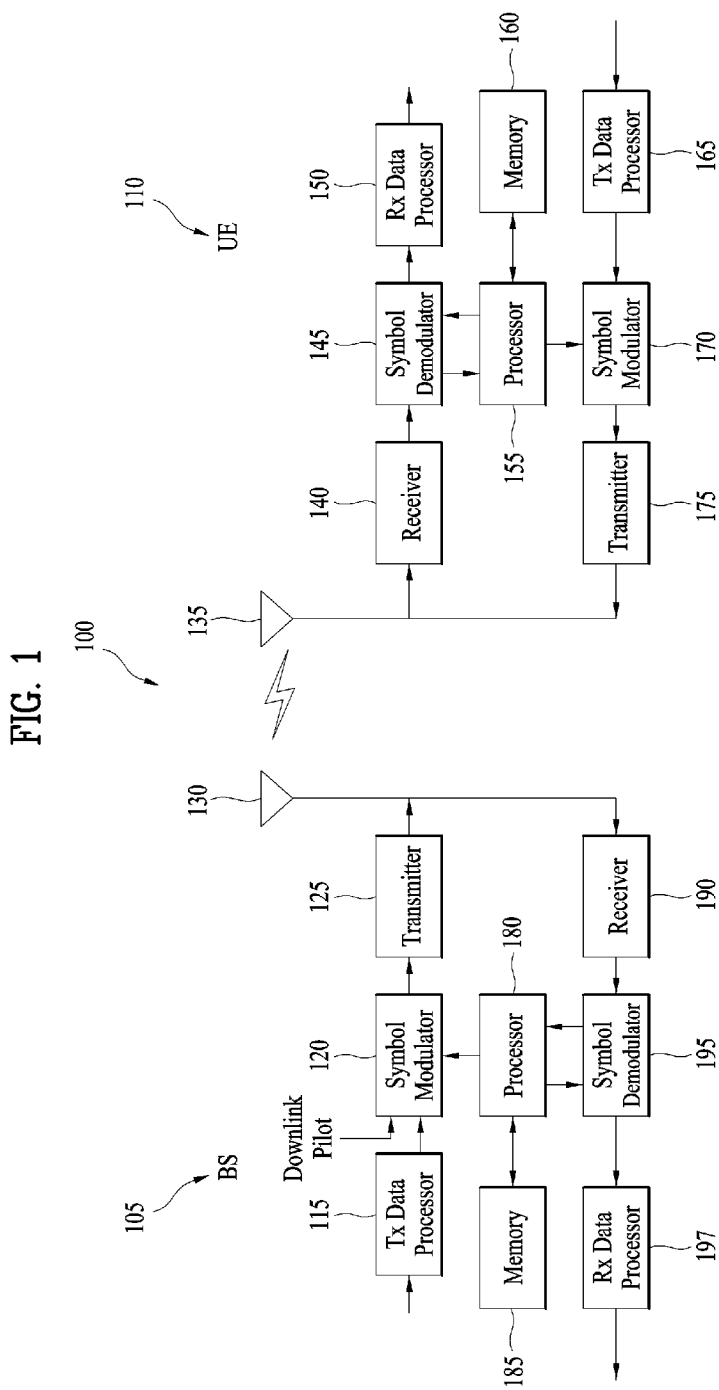
FIG. 1 is a block diagram illustrating a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

For wireless transmission between a BS and a UE, transmission from a BS to a UE is expressed as downlink transmission, and transmission from a UE to a BS is expressed as uplink transmission. A mode for identifying radio resources between downlink transmission and uplink transmission will be defined as a duplex mode, and bidirectional transmission and reception through division of a frequency band into a downlink transmission band and an uplink transmission band will be expressed as a frequency division duplex (FDD) mode. It will be apparent that the technology suggested in the present invention may be operated in time division duplex (TDD) for bidirectional transmission and reception through division of a time resources into a downlink transmission time and an uplink transmission time and full duplex for bidirectional transmission and reception through sharing of time and frequency resources as well as the FDD.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention suggests a method for a Non-orthogonal Coded Multiple Access (NCMA) scheme for throughput enhancement and massive connectivity support.

Figure 2:
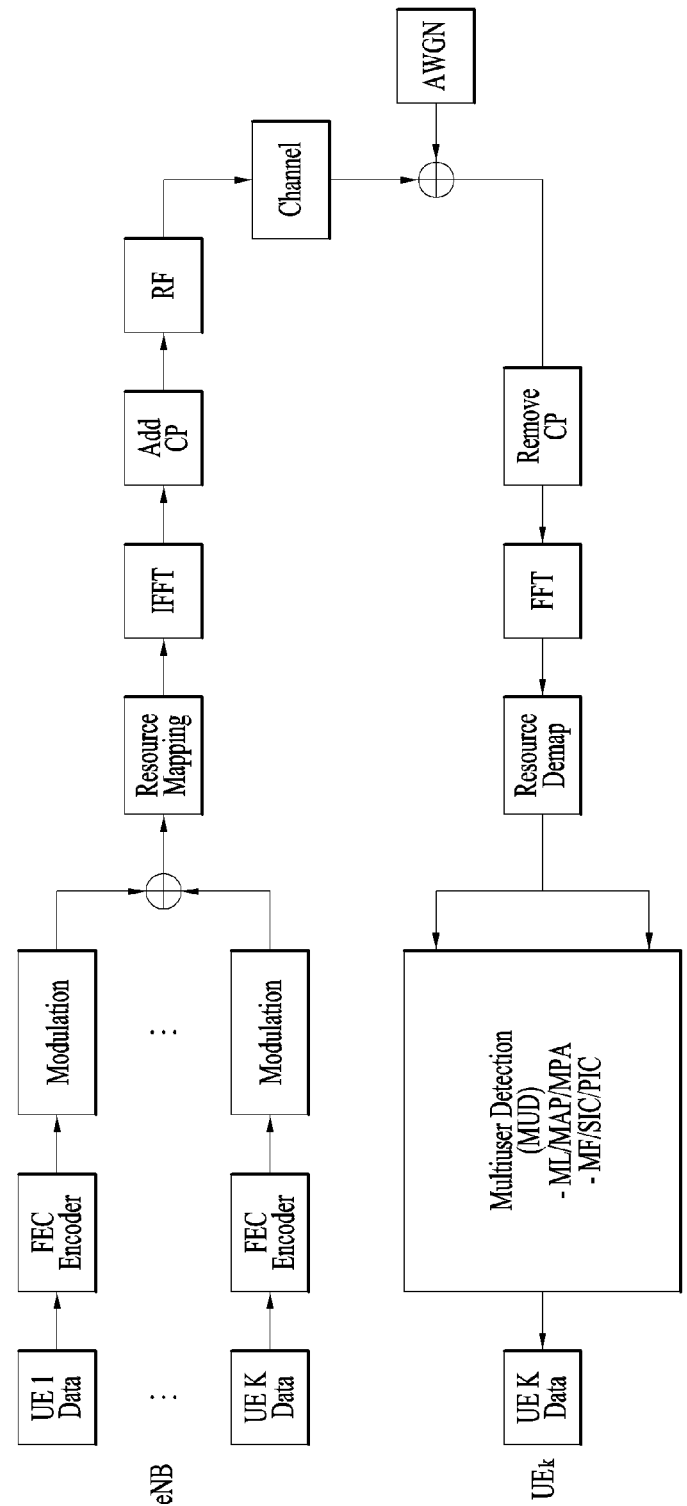
FIG. 2 is a block diagram illustrating NOMA based downlink transmission/reception (Tx/Rx) of a communication apparatus.

FIG. 2 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 2 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 2 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 2 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 2 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 3:
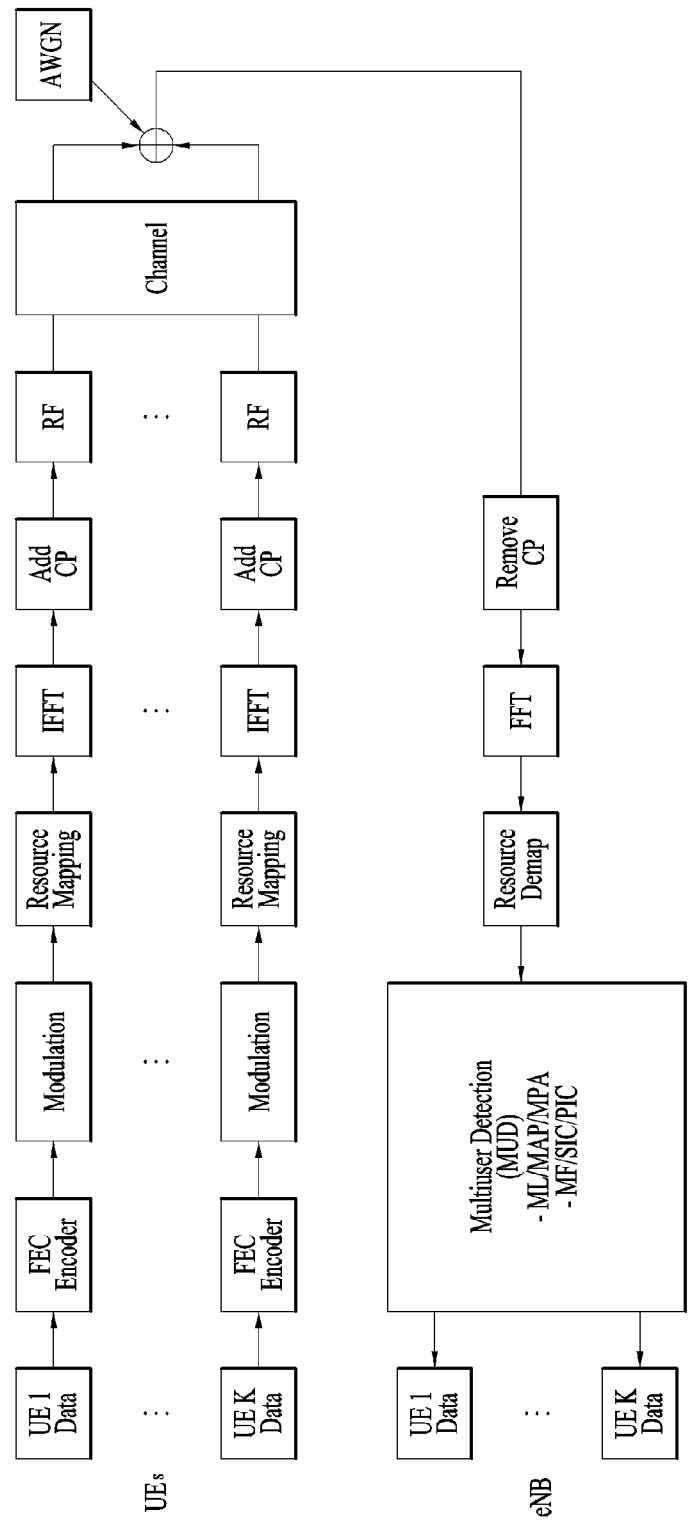
FIG. 3 is a block diagram illustrating NOMA based uplink transmission/reception (Tx/Rx) of a communication apparatus.

FIG. 3 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 3. Each system may transmit multi-UE data in the same manner as the description of the downlink structure of FIG. 2 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 2 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) = \log_2\left(1 + \frac{\text{Channel Gain}}{MUI + \text{Noise}}\right), \forall k$$

In transmission capacity of the above Equation 2, the number of $R_k$ added in accordance with increase of K may be increased, whereby increase of C may be expected. However, each $R_k$ may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 4:
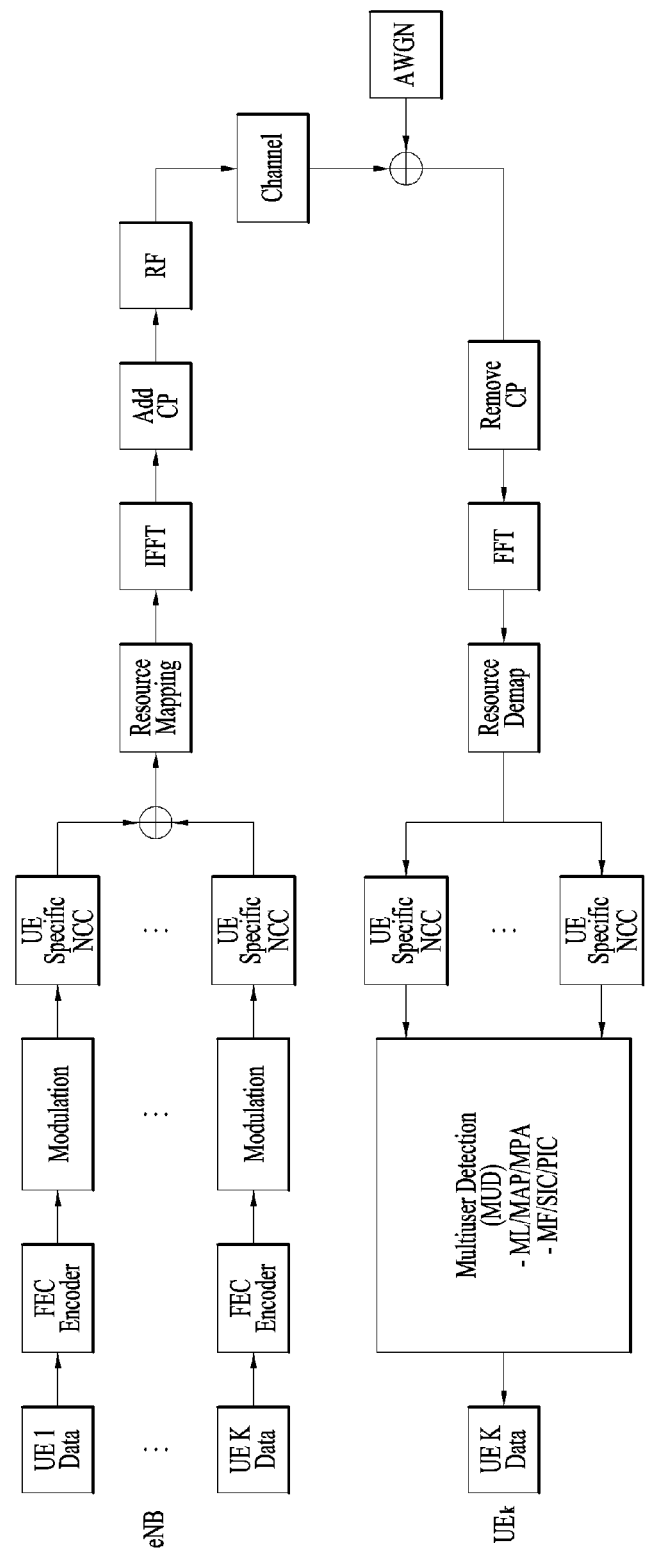
FIG. 4 is a block diagram illustrating NCMA based downlink transmission/reception (Tx/Rx) of a communication apparatus.
Figure 5:
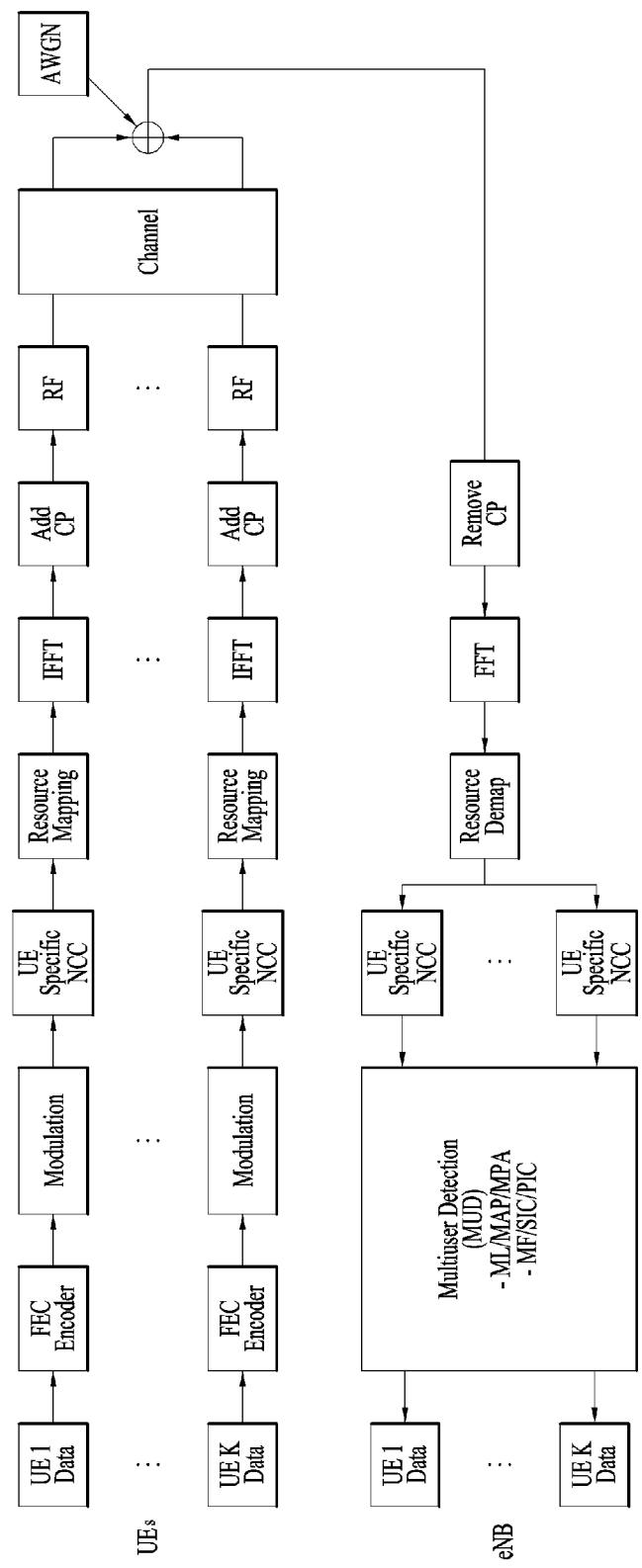
FIG. 5 is a block diagram illustrating NCMA based uplink transmission/reception (Tx/Rx) of a communication apparatus.

FIG. 4 is a block diagram illustrating NCMA based downlink transmission/reception (Tx/Rx) of a communication apparatus, and FIG. 5 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 4 and 5 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $\min_C (\max_{1 \leq k < j \leq K} \sqrt{1-|c^{(k)*} \cdot c^{(j)}|^2})$, $C \subset \mathbb{C}^{N \times K}$. The UE-specific NCC has features as expressed by the following Equation 4.

[Equation 4]

$$\begin{cases} |c^{(k)*} \cdot c^{(k)}| = 1, \forall k, k = 1, \ldots, K, \\ \text{if } N > K, |c^{(k)*} \cdot c^{(j)}| = \delta, \forall k, \forall j, k = 1, \ldots, K, j = 1, \ldots, K, \\ \text{if } N \leq K, |c^{(k)*} \cdot c^{(j)}| = 0, \forall k, \forall j, k = 1, \ldots, K, j = 1, \ldots, K \end{cases}$$

In this case, $c^{(k)*}$ is a conjugate codeword of $c^{(k)}$. The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,K} \geq \sqrt{1 - \frac{(N-1)K}{N(K-1)}}.$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook $[c^{(1)} \ldots c^{(K)}]$ |
| --- | --- |
| 2 | $\begin{bmatrix} 1 & 1 \\ 1 & -1 \end{bmatrix}$ |
| 3 | $\begin{bmatrix} -0.5078 - 0.2451i & -0.8055 + 0.5684i & -0.1483 - 0.4194i \\ 0.5640 - 0.6034i & 0.1640 + 0.0357i & -0.8751 - 0.1904i \end{bmatrix}$ |
| 4 | $\begin{bmatrix} -0.4907 - 0.7256i & -0.6440 - 0.5906i & -0.1657 + 0.2160i & -0.5775 - 0.2480i \\ 0.4510 + 0.1709i & -0.4452 + 0.1956i & 0.9349 - 0.2279i & -0.3586 - 0.6902i \end{bmatrix}$ |

Table 2 illustrates a codebook in case of Spreading Factor N=4.

TABLE 2

| # of codewords (Max. # of users: K) | Examples of spreading codebook $[c^{(1)} \ldots c^{(K)}]$ |
|---|---|
| 4 | $\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 6 | $\begin{bmatrix} -0.0557-0.4476i & -0.1684-0.8131i & -0.0149+0.2205i & \ldots \\ & -0.0198-0.1206i & -0.3294-0.3689i & -0.0487+0.4148i \\ 0.4023-0.1460i & -0.4021+0.2118i & -0.6703+0.0282i & \ldots \\ & -0.6521-0.4251i & -0.0729-0.0903i & -0.2158-0.3003i \\ -0.1499-0.3961i & 0.0471-0.2647i & 0.3131-0.5204i & \ldots \\ & -0.5576-0.0206i & 0.6726-0.0552i & 0.0357+0.0924i \\ 0.5675+0.3346i & -0.0866+0.1557i & -0.0287+0.3624i & \ldots \\ & -0.0286+0.2589i & 0.4567-0.2792i & 0.6985+0.4372i \end{bmatrix}$ |
| 8 | $\begin{bmatrix} -0.2381-0.8369i & -0.6599-0.1222i & -0.6557-0.1776i & -0.1561+0.0861i & \ldots \\ & -0.1374+0.1275i & -0.1849+0.3859i & -0.2426-0.2248i & -0.1703-0.0604i \\ -0.2593-0.3320i & 0.4906+0.0221i & 0.3934+0.2749i & -0.3453-0.2068i & \ldots \\ & -0.5596+0.0272i & 0.0616+0.0315i & -0.3027-0.3133i & -0.7664+0.1256i \\ -0.1249+0.0320i & 0.0425+0.3856i & 0.0440-0.3295i & -0.3979+0.0525i & \ldots \\ & -0.5272-0.2195i & 0.0649-0.8770i & -0.2452+0.4427i & -0.0149-0.4727i \\ -0.2180-0.0342i & 0.3968-0.0250i & -0.3444-0.2811i & -0.7817-0.1845i & \ldots \\ & 0.2417+0.5162i & 0.1956-0.0203i & 0.4625-0.4805i & 0.0794-0.3663i \end{bmatrix}$ |

Various values may be obtained using mathematical equation or algorithm in addition to the above Tables 1 and 2.

Figure 6:
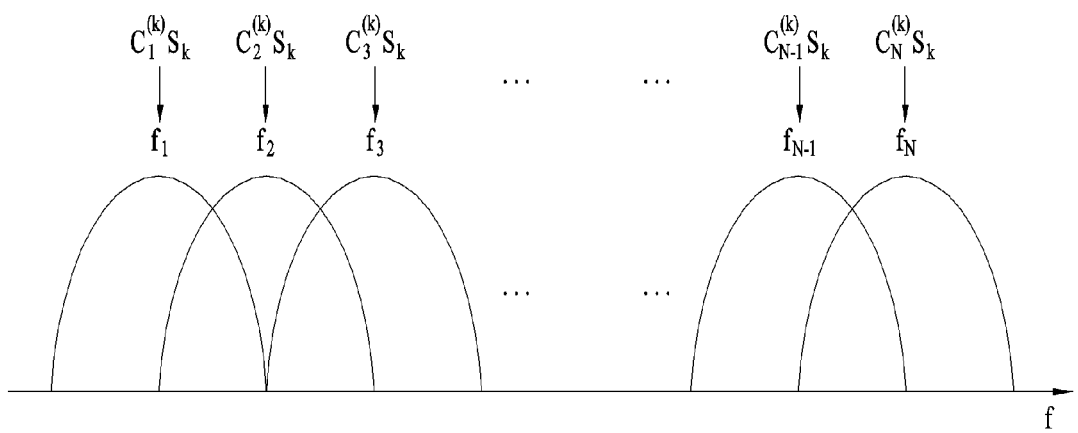
FIG. 6 is a conceptual diagram illustrating a frequency axis of data transmission according to UE-specific NCC.

FIG. 6 is a conceptual diagram illustrating a frequency axis of data transmission according to UE-specific NCC.

FIG. 6 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol $s_k$ corresponds to a codeword vector $c^{(k)}$ of (N×1) dimension. Then, N elements of the codeword correspond to N subcarriers.

That is, in FIG. 6, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 7:
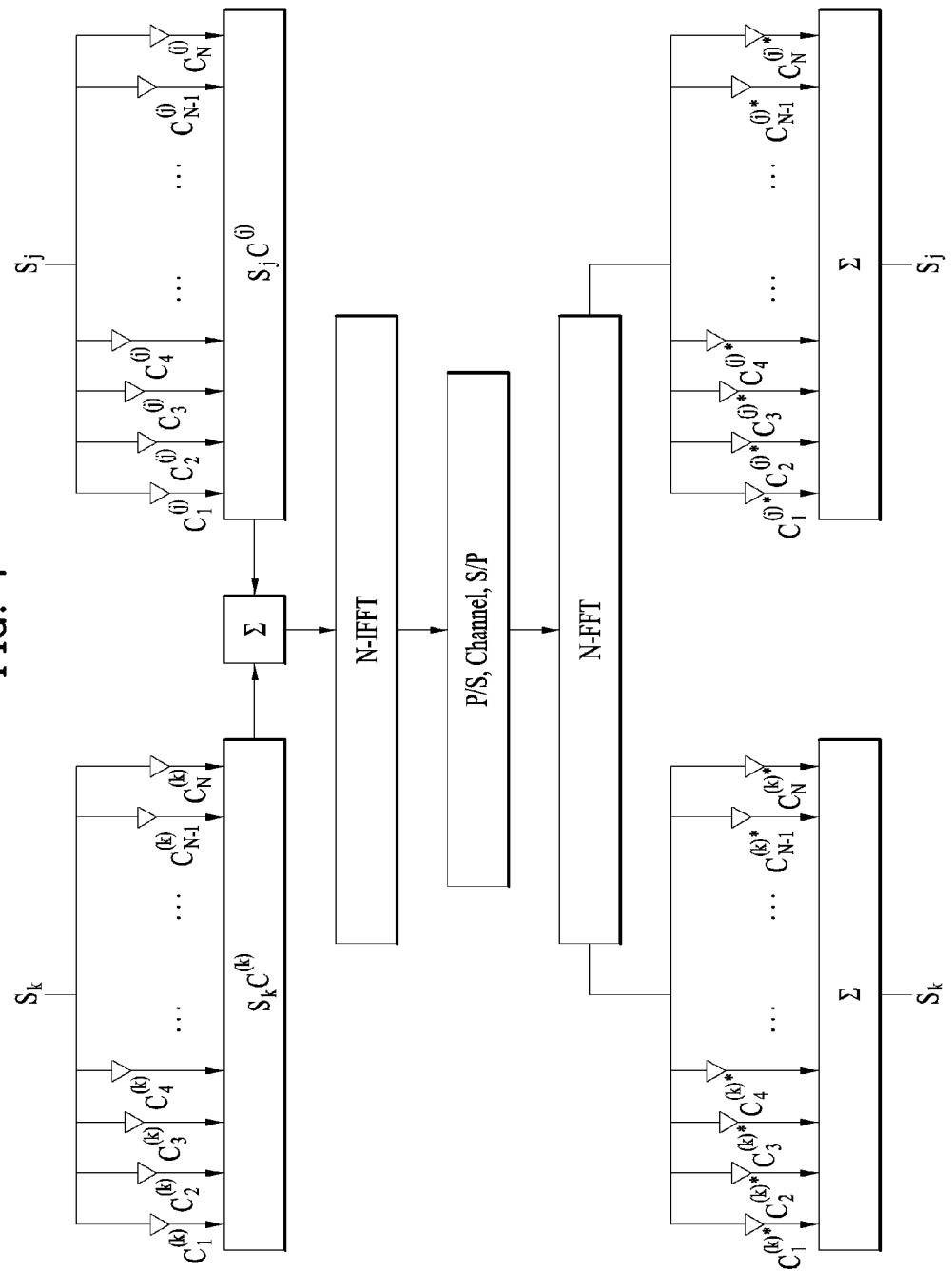
FIG. 7 is a structural diagram illustrating basic transmission and reception of NCMA system.

FIG. 7 is a structural diagram illustrating basic transmission and reception of NCMA system.

FIG. 7 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k,$$  [Equation 5]

$$\hat{y}_k = \left[ \frac{[y_k]_j}{[H_k]_{j,j}} \right]_{j=1,\ldots,N} = \sum_{n=1}^{K} c^{(n)} s_n + \hat{n}_k,$$

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[ \frac{[A]_j}{[B]_{j,j}} \right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k,$$

$$= s_k + \sum_{n \neq k, n=1}^{K} c^{(k)*} \cdot c^{(n)} \cdot s_n + \tilde{n}_k.$$

[Equation 6]

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n,$$

[Equation 7]

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \left[ \frac{[y]_j}{[H_k]_{j,j}} \right]_{j=1,\ldots,N} =$$

$$c^{(k)} s_k + \sum_{n=1}^{K} \left[ \frac{[H_n]_{j,j}}{[H_k]_{j,j}} \right]_{j=1,\ldots,N} c^{(n)} s_n + \hat{n},$$

[Equation 8]

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot$$

$$\left[ \frac{[H_n]_{j,j}}{[H_k]_{j,j}} \right]_{j=1,\ldots,N} c^{(n)} s_n + \tilde{n},$$

$$= s_k + \sum_{n \neq k, n=1}^{K} c^{(k)*} \cdot \left[ \frac{[H_n]_{j,j}}{[H_k]_{j,j}} \right]_{j=1,\ldots,N} c^{(n)} \cdot s_n + \tilde{n}.$$

[Equation 9]

In the above Equation 9, the second item of the last column indicates MUI, and may be removed or reduced through the MUD scheme. At this time, frequency-axis channel change of $$\left[ \frac{[H_n]_{j,j}}{[H_k]_{j,j}} \right]_{j=1,\ldots,N}$$

causes a change of MUI value when MUD according to UE-specific NCC is performed due to a change of a channel environment from the multi-UE. For convenience of description, a single transmitting and receiving antennas is provided, it will be apparent that the same scheme is applied to even an environment where multiple antennas are used.

According to the description related to the aforementioned NCMA scheme, it is possible to achieve higher frequency usage efficiency or more massive connectivity in accordance with the number of superposed UEs while controlling MUI according to multi-UE data superposition transmission.

Hereinafter, a signal flow between the transmitter and the receiver for the NCMA scheme will be described. A scheme and signaling of codebook information exchange for NCMA are required to perform the NCMA scheme, and will be described below.

Figure 8:
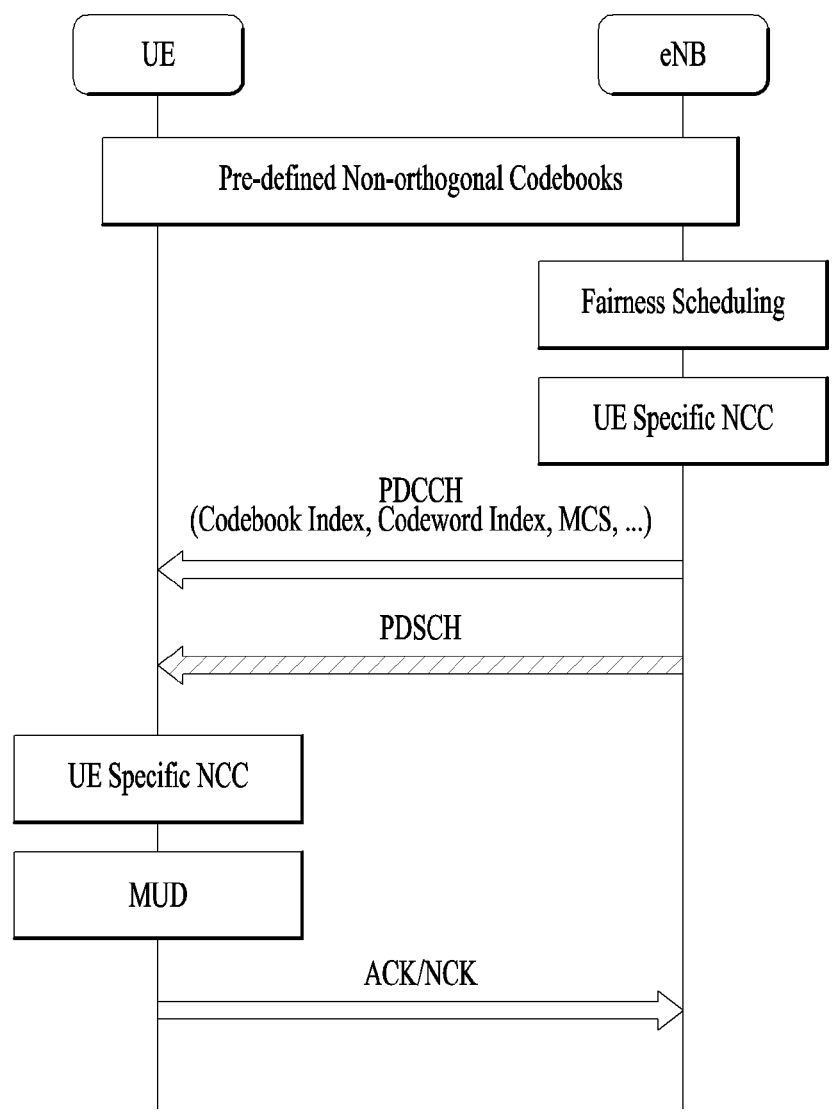
FIG. 8 is a signal flow chart illustrating a downlink NCMA system.
Figure 9:
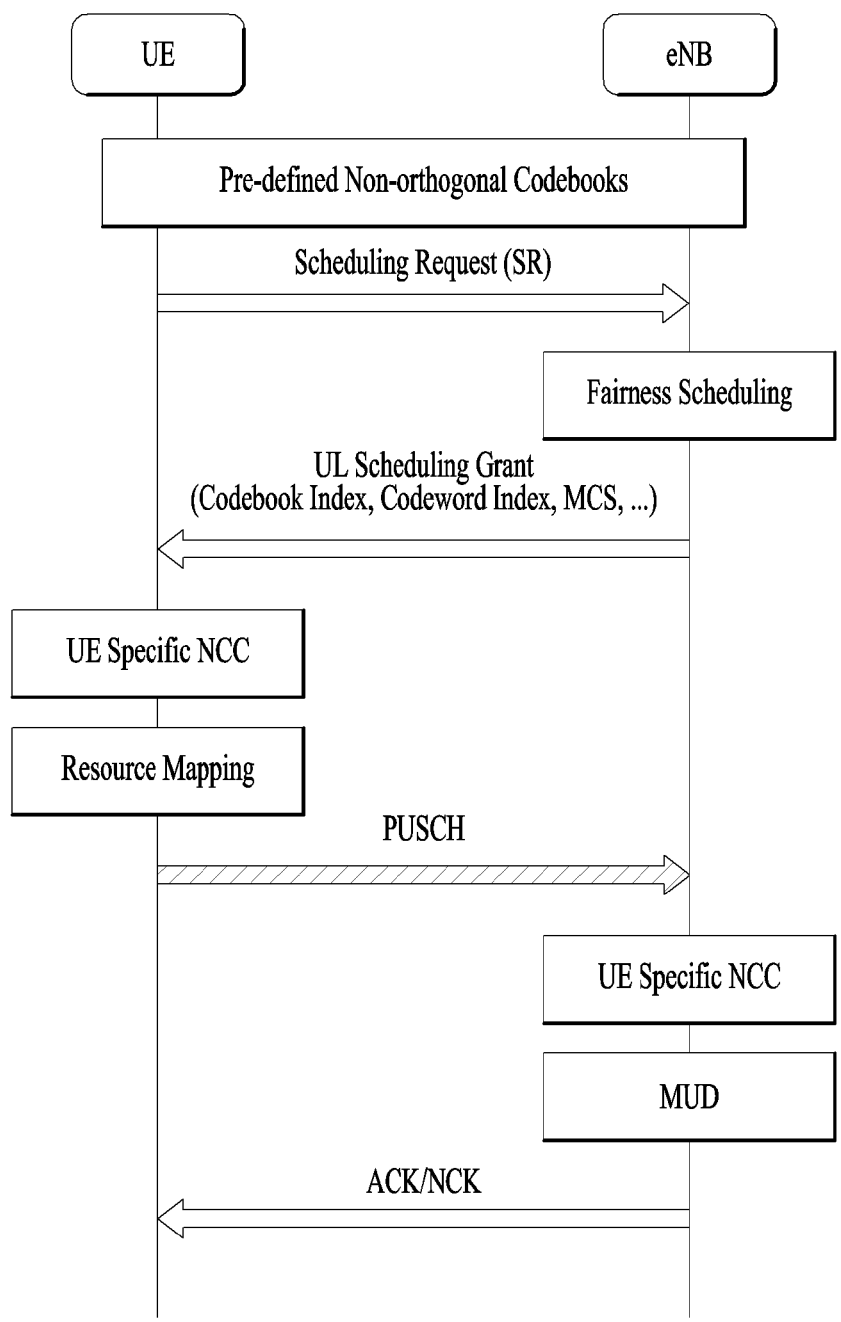
FIG. 9 is a signal flow chart illustrating an uplink NCMA system.

FIG. 8 is a signal flow chart illustrating a downlink NCMA system, and FIG. 9 is a signal flow chart illustrating an uplink NCMA system.

Referring to FIGS. 8 and 9, the UE may share information of predefined non-orthogonal codebooks with the base station (eNB). At this time, there may be various methods having predefined non-orthogonal codebook information.

For example, the method having predefined non-orthogonal codebook information 1) stores codebooks defined for each of N and K when codebook of (N×K) dimension defined by Grassmannian line packing is G(N, K), and 2) has a basis vector of (N×1) dimension codeword constituting G(N, K).

Index information on the non-orthogonal codebooks or the basis vectors defined by the above method may be defined as codebook index.

If a downlink transmission request occurs as illustrated in FIG. 8, UE-specific NCC, which will be used by each UE, may be allocated through a specific scheduling scheme (for example, fairness scheduling) of the base station. The base station may transmit codebook index corresponding to the allocated UE-specific NCC, codeword index within the corresponding codebook, information (for example, MCS index) on MCS level to the UE as control information (for example, by being included in PDCCH). In this way, the base station may select NCC information (codebook index and codeword index) for each UE in accordance with the scheduling scheme and notify the UE of the selected information. The base station may transmit a downlink data channel (for example, PDSCH (Physical Downlink Shared Channel) to the UE on the basis of the allocated codebook index and the codeword index and/or the selected MCS level in accordance with the scheduling scheme. The UE may receive the downlink data channel (for example, PDSCH) in accordance with scheduling of the control information.

The UE may demodulate data and detect its data from data of multiple UEs by performing MUD scheme on the basis of the codebook index and the codeword index received from the base station. At this time, when the codebook of (N×K) dimension defined by Grassmannian line packing is G(N, K)

like the above 1), if the scheme of the predefined codebook corresponds to that stored for each of N and K, the stored codebook is used as it is. Meanwhile, if the scheme of the predefined codebook corresponds to that has a basis vector of (N×K) dimension codeword constituting the G(N,K), the base station and the UE may generate and use G(N,K) on the basis of the stored basis vector. At this time, the number of codewords allocated to each UE may be 1 or 2. That is, it will be apparent that a UE which requires a high data rate may transmit two or more symbols through two or more codewords to allow the receiver to demodulate two or more codewords.

Also, in case of the uplink NCMA system, as illustrated in FIG. 9, the UE may transmit a scheduling request (SR) signal to the base station to request uplink information transmission. If an uplink information transmission request occurs, the base station may allocate an uplink scheduling grant to the UE through a specific scheduling scheme (for example, fairness scheduling scheme). The base station may transmit an uplink scheduling grant, which includes codebook index and codeword index and/or MCS level information (for example, MCS index) determined based on the scheduling scheme, to the UE.

Then, the UE may perform resource mapping for uplink signal transmission on the basis of the received UE-specific NCC information (codebook index and codeword index) and/or MCS level information. The UE may transmit an uplink data channel (for example, PUSCH (Physical Uplink Shared Channel) according to the resource mapping. The base station may demodulate data and detect PUSCH of the UE by performing MUD scheme on the basis of the codebook index and the codeword index allocated to the UE.

In FIGS. 8 and 9, N and K for determining dimension of the codebook may be changed depending on a system environment. If K is equal to or smaller than N, a codebook of G(N,N), which is an orthonormal codebook, is used.

In accordance with the determined G(N,K), a chordal distance between the respective codewords may be defined as described in the NCMA scheme, and may be defined by MUI. The base station may perform resource management on the basis of MUI value for fairness scheduling, and may determine MCS level through a demodulation error rate based on the MUI value. The base station may perform fairness scheduling on the basis of the determined MCS level.

Although the present invention has been described based on a downlink and an uplink of a cellular system, the present invention is applicable to all systems which use Machine Type Communication (MTC), Device-to-Device (D2D) and Vehicle-to-Everything (V2X).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for transmitting and receiving a signal based on a non-orthogonal multiple access scheme and an apparatus therefor are industrially applicable to various wireless communication systems such as 3GPP LTE-A and 5G system.

The invention claimed is:

1. A method for receiving, by a user equipment (UE), a signal based on a non-orthogonal multiple access scheme in a wireless communication system, the method comprising:
   receiving, from a base station (BS), control information including information on a codebook selected for the UE among predefined codebooks for non-orthogonal multiple access and information on a codeword selected from the selected codebook;
   receiving, from the BS, data for the UE according to scheduling of the control information; and
   detecting data for the UE by performing a multi-user detection (MUD) scheme based the information on the selected codebook and the information on the selected codeword,
   wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

2. The method according to claim 1, wherein the information on the codebook selected for the UE and the information on a codeword selected from the selected codebook are selected based on a scheduling scheme.

3. The method according to claim 1, wherein the information on the selected codebook includes a selected codebook index, and the information on the selected codeword includes a selected codeword index.

4. The method according to claim 3, wherein the selected codebook index and the selected codeword index are selected UE-specifically.

5. A method for transmitting, by a base station (BS), a signal based on a non-orthogonal multiple access scheme in a wireless communication system, the method comprising the steps of:
   selecting a codebook selected for the UE among predefined codebooks for non-orthogonal multiple access and a codeword for the UE from the selected codebook;
   transmitting, to the UE, control information including information on the selected codebook and the information on the selected codeword; and
   transmitting, to the UE, data for the UE according to scheduling of the control information, wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

6. The method according to claim 5, wherein the selected codebook and the selected codeword are selected based on a scheduling scheme.

7. The method according to claim 5, wherein the selected codebook and the selected codeword are selected UE-specifically.

8. A user equipment (UE) for receiving a signal based on a non-orthogonal multiple access scheme in a wireless communication system, the UE comprising:
   a receiver configured to:
      receive, from a base station (BS), control information including information on a codebook selected for the UE among predefined codebooks for non-orthogonal multiple access and information on a codeword selected from the selected codebook; and
      receive, from the BS, data for the UE according to scheduling of the control information; and
   a processor configured to detect data for the UE by performing a multi-user detection (MUD) scheme based on the information on the selected codebook and the information on the selected codeword,
   wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

9. A base station (BS) for transmitting a signal based on a non-orthogonal multiple access scheme in a wireless communication system, the BS comprising:
   a processor configured to select a codebook for a UE among predefined codebooks for non-orthogonal multiple access and a codeword for the UE from the selected codebook; and
   a transmitter configured to transmit, to the UE, control information including information on the selected codebook and the information on the selected codeword and transmit, to the UE, data for the UE according to scheduling of the control information,
   wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

10. A method for transmitting, by a user equipment (UE), a signal based on a non-orthogonal multiple access scheme in a wireless communication system, the method comprising the steps of:
    receiving, from a base station (BS), control information including information on a codebook selected for the UE among predefined codebooks for non-orthogonal multiple access and information on a codeword selected from the selected codebook;
    performing resource mapping for an uplink signal to be transmitted based on the information on the selected codebook and the information on the selected codeword; and
    transmitting, to the BS, the uplink signal mapped into a corresponding resource in accordance with the resource mapping,
    wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

11. The method according to claim 10, wherein the selected codebook and the selected codeword are selected UE-specifically.

12. A method for receiving, by a base station (BS), a signal based on a non-orthogonal multiple access scheme in a wireless communication system, the method comprising the steps of:
    selecting a codebook for the UE among predefined codebooks for non-orthogonal multiple access and a codeword for the UE from the selected codebook;
    transmitting, to the UE, control information including information on the selected codebook and information on the selected codeword;
    receiving, from the UE, an uplink signal of the UE according to scheduling of the control information; and
    detecting the uplink signal transmitted from the UE by performing multi-user detection (MUD) scheme based on the selected codebook and the selected codeword,
    wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

13. The method according to claim 12, wherein the information on the selected codebook includes an index of the selected codebook, and the information on the selected codeword includes an index of the selected codeword, and the selected codebook index and the selected codeword index are selected UE-specifically.

14. The method according to claim 12, wherein the selected codebook and the selected codeword are selected based on a scheduling scheme.

15. A user equipment (UE) for transmitting a signal based on a non-orthogonal multiple access scheme in a wireless communication system, the UE comprising:
- a receiver configured to receive, from a base station (BS), control information including information on a codebook selected for the UE among predefined codebooks for non-orthogonal multiple access and information on a codeword selected from the selected codebook;
- a processor configured to perform resource mapping for an uplink signal to be transmitted based on the information on the selected codebook and the information on the selected codeword; and
- a transmitter configured to transmit, to the BS, the uplink signal mapped into a corresponding resource in accordance with the resource mapping,
- wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

16. A base station (BS) for receiving a signal based on a non-orthogonal multiple access scheme in a wireless communication system, the BS comprising:
- a processor configured to select a codebook for the UE among predefined codebooks for non-orthogonal multiple access and a codeword for the UE from the selected codebook;
- a transmitter configured to transmit, to the UE, control information including information on the selected codebook and information on the selected codeword; and
- a receiver configured to receive, from the UE, an uplink signal of the UE according to scheduling of the control information,
- wherein the processor is configured to detect the uplink signal transmitted from the UE by performing multi-user detection (MUD) scheme based on the selected codebook and the selected codeword,
- wherein the selected codebook is configured that a chordal distance between codewords to have a value of $$\sqrt{1 - \frac{(N-1)K}{N(K-1)}}$$

or more, where N indicates a vector length of a codeword, and K indicates a number of codewords.

* * * * *